United States Patent
Luo

(10) Patent No.: US 8,272,264 B2
(45) Date of Patent: Sep. 25, 2012

(54) ALL WORKING CONDITION CONTINUOUSLY MEASURING LIQUID LEVEL METER FOR A STEAM DRUM OF A BOIL AND THE LIQUID LEVEL COMPUTING METHOD THEREOF

(75) Inventor: Ming Luo, Beijing (CN)

(73) Assignee: Beijing Capstar Automation Instrument Co., Ltd., Beijing (CN)

( * ) Notice: Subject to any disclaimer, the term of this patent is extended or adjusted under 35 U.S.C. 154(b) by 259 days.

(21) Appl. No.: 12/531,490

(22) PCT Filed: Oct. 22, 2007

(86) PCT No.: PCT/CN2007/003012
§ 371 (c)(1),
(2), (4) Date: Sep. 16, 2009

(87) PCT Pub. No.: WO2009/046579
PCT Pub. Date: Apr. 16, 2009

(65) Prior Publication Data
US 2010/0180679 A1 Jul. 22, 2010

(30) Foreign Application Priority Data
Oct. 10, 2007 (CN) .......................... 2007 1 0163870

(51) Int. Cl.
*G01F 23/26* (2006.01)

(52) U.S. Cl. .................... 73/304 C; 73/304 R; 116/109; 116/227

(58) Field of Classification Search ................ 73/304 C, 73/304 R; 116/109, 227
See application file for complete search history.

(56) References Cited

U.S. PATENT DOCUMENTS

| | | | |
|---|---|---|---|
| 5,103,368 A * | 4/1992 | Hart | 361/284 |
| 6,318,172 B1 * | 11/2001 | Byatt et al. | 73/304 C |
| 6,666,086 B2 * | 12/2003 | Colman et al. | 73/304 C |
| 2006/0021431 A1 * | 2/2006 | Immel | 73/304 C |

* cited by examiner

*Primary Examiner* — Hezron E Williams
*Assistant Examiner* — Paul West
(74) *Attorney, Agent, or Firm* — Lin & Associates IP, Inc.

(57) ABSTRACT

A type of liquid level gauge for continuous measurement of boiler steam drum under full conditions and its method for calculation of liquid level, this liquid level gauge includes one metal measurement tube and one transmitter. The steam-side pipe connected to steam drum is fitted on the upper part of the metal measurement tube and the water-side pipe connected to steam drum is fitted on the lower part of the metal measurement tube, one insulated jacket pipe is available inside the metal measurement tube and 1# probe, 2# probe, and 3# probe are mounted from down upwards inside the insulated jacket pope. The respective probes are mutually insulated and not conducted. The three probes are respectively connected with the transmitter through lead wires of the probes. This liquid level gauge is able to monitor the water and steam dielectric constants in a real-time manner, and the liquid level values can be outputted accurately in a continuous way with the liquid level gauge for boiler steam drum designed according to this invention in all the cases, no matter the boiler is under the startup, shutdown, or joint discharge status, etc, thus to achieve the function for a continuous measurement of liquid level under full conditions.

5 Claims, 1 Drawing Sheet

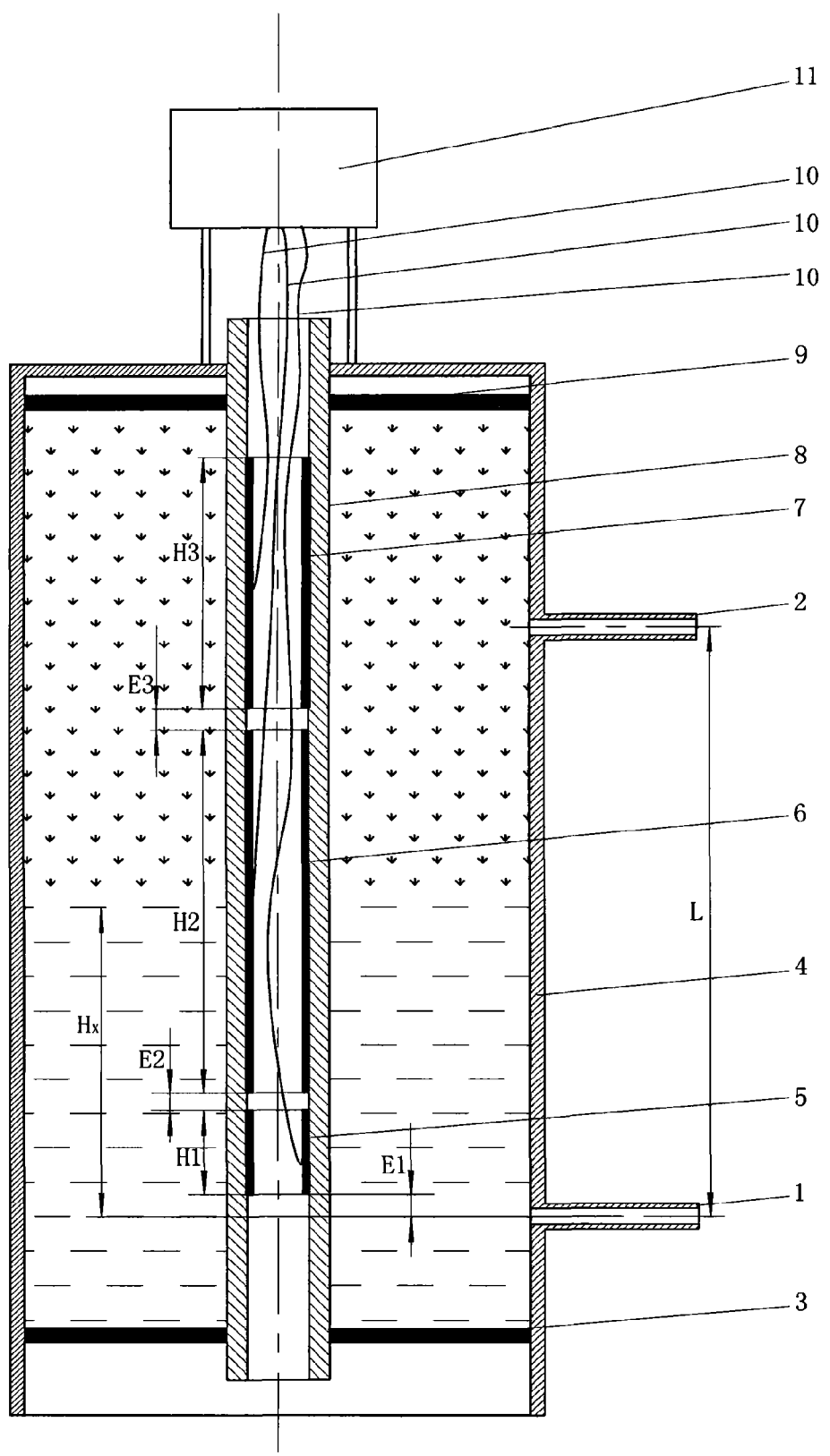

ALL WORKING CONDITION CONTINUOUSLY MEASURING LIQUID LEVEL METER FOR A STEAM DRUM OF A BOIL AND THE LIQUID LEVEL COMPUTING METHOD THEREOF

FIELD OF THE INVENTION

This invention involves the technical field of liquid level measurement, and especially involves a liquid level gauge with the function for continuous measurement of liquid level of boiler steam drum under full conditions and its method for calculation of liquid level.

BACKGROUND OF THE INVENTION

As water and steam inside the boiler steam drum are both in the forms of high temperature and high pressure, and the changes in work conditions are complicated, the measurement of its liquid level has always been a difficult problem. The principle of measurement with balance container for most liquid level gauges of boiler steam drums used for adjustment and protection is adopted at present, while the measurement of steam drum with balance container is affected by work conditions, the measurement has often been inaccurate and failed for use during boiler startup and boiler shutdown, and additionally it may possibly give rise to failure of normal measurement when anomalous work condition is confronted during boiler operation, which has grievously affected the safe operation of boiler. While as only discontinuous measurement of liquid level can be applied to liquid level with electrical contact level gauges during boiler startup and shutdown or under anomalous work condition, namely the displayed liquid level can only be a range, therefore it cannot be used for automatic regulation of water level, and at the same time for the restriction of reliability, it is generally neither used for protection of liquid level.

The pressure of boiler steam drum varies from 2 Mpa to 20 Mpa in general according to the size of unit, and the corresponding temperatures of saturated water and steam vary from 212° C. to 365° C. The dielectric constants of water and steam at normal temperature are 80 and 1, respectively, the dielectric constants of water and steam at 365° C. are 9.94 and 2.65, respectively, the change in dielectric constant of water is approximately 10 times, while the conventional capacitive level gauge can only be used on the occasions when the dielectric constant of medium measured is relative stable, and therefore, it can neither be used for liquid level measurement of boiler steam drums.

SUMMARY OF THE INVENTION

The purpose of this invention is to provide a type of liquid level gauge for continuous measurement of boiler steam drum under full conditions, and with this level gauge, the value of liquid level can be calculated according to the water and steam dielectric constants monitored in a real-time manner. Whichever status the boiler is under such as boiler startup and boiler shutdown, or boiler joint discharge, etc, the values of liquid level can be continuously outputted reliably and accurately in all cases with this liquid level gauge, thus to achieve the function for a continuous measurement of liquid level under full conditions.

Another purpose of this invention is to provide a calculation method with a type of liquid level of boiler steam drum through continuous measurement of all work conditions.

The purpose of this invention is achieved in such a way: a type of liquid level gauge for continuous measurement of boiler steam drum under full conditions, and the liquid level gauge for boiler steam drum mentioned includes one metal measurement tube and one transmitter. The steam-side pipe connected to steam drum is fitted on the upper part of the metal measurement tube mentioned and the water-side pipe connected to steam drum is fitted on the lower part of the metal measurement tube mentioned, one insulated jacket pipe is available inside the metal measurement tube mentioned, 1# probe, 2# probe, and 3# probe are mounted in turn from down upwards inside the insulated jacket pipe mentioned, and respective probes are mutually insulated and are not conducted. The three probes mentioned are respectively connected with the transmitter through lead wires.

The lead wires for the probes mentioned are the shielded conducting wires, the core on one end of the shielded conducting wire is connected with probe, and the core on the other end of the shielded conducting wire mentioned and the shielding layer are connected to the transmitter:

The three probes mentioned measure capacitance by turns, and both the other probes will stop measurement at the same time when any of the three probes is measuring the capacitance.

The method for calculation of liquid level with the liquid level gauge for continuous measurement of boiler steam drum under full conditions, and the method mentioned for calculation of liquid level is:

The parameters calibrated for the liquid level gauge are used, to measure the capacitance values of 1# probe, 2# probe, and 3# probe during the work of the gauge, and 1# probe and 3# probe are used to respectively monitor the dielectric constants of water and steam.

Firstly dA and dB are calculated, respectively:

A) When the condition of $$Cx2 - Ce2 > \frac{Cx3 - Ce3}{H3} \times H2$$

is complied, dA is updated, $$dA = \frac{Cx1 - Ce1}{H1}$$

B) When the condition of $$\frac{Cx1 - Ce1}{H1} \times H2 > (Cx2 - Ce2)$$

is compliant, dB is updated, $$dB = \frac{Cx3 - Ce3}{H3}$$

C) When the condition is incompliant, then dA or dB updated for the latest time is used.

D) The preset dA and dB are used when the liquid level gauge is just electrified.

Then the liquid level value Hx is calculated:
1) The temporary variable hx of liquid level is figured out without consideration about E2 and E3:

$$hx = \frac{(Cx1 + Cx2 + Cx3 - Ce1 - Ce2 - Ce3) - (H1 + H2 + H3) \times dB}{dA - dB} + E1$$

2) The position range of liquid level is judged according to the calculated hx value, and the actual liquid level Hx is calculated:
A) At the time of hx>E1+H1+H2, the liquid level is in the place of 3# probe, $$Hx = hx + E2 + E3$$

B) When Condition A is incompliant, and at the time of hx>E1+H1, the liquid level is in the place of 2# probe, $$Hx = hx + E2$$

C) When Condition B is neither compliant, it indicates that the liquid level does not exceed 1# probe, and at this point there is no need for Hx to be changed, namely:

$$Hx = hx$$

of which:
H1, H2, and H3: are respectively the physical heights of 1# probe, 2# probe, and 3# probe.
Ce1, Ce2, and Ce3: The capacitances of null values, and are the measured values for capacitances of 1# probe, 2# probe, and 3# probe respectively when the medium is air.
Cx1, Cx2, and Cx3: The capacitance values of 1# probe, 2# probe, and 3# probe measured during the work of the liquid level gauge.
E1: the distance from the lower end of 1# probe to the centerline of water-side pipe of steam drum.
E2 and E3: are respectively the clearances between 1# probe and 2# probe as well as between 2# probe and 3# probe.
L: the range of liquid level gauge, namely the center distance of the boiler water-side pipe and steam-side pipe.
dA: the increment of capacitance between the measurement probes and the metal measurement tube aroused by water relative to air at unit height, and the change in dA has reflected the variation of water dielectric constant.
dB: the increment of capacitance between the measurement probes and the metal measurement tube aroused by steam phase relative to air at unit height, and the change in dB has reflected the variation of steam dielectric constant.
hx: the temporary variable of liquid level.
Hx: the value of liquid level.

The method for calculation of liquid level with a type of liquid level gauge for continuous measurement of boiler steam drum under full conditions, and the method mentioned for calculation of liquid level is:

The parameters calibrated for the liquid level gauge are used, to measure the capacitance values of 1# probe, 2# probe, and 3# probe during the work of the gauge, the 1# probe and the 3# probe are used to respectively monitor the dielectric constants of water and steam, and the capacitances of null value Ce1, Ce2, and Ce3 as well as the capacitances of full value Cm1, Cm2, and Cm3 are used to calculate and get the mapping heights of 1# probe and 3# probe relative to 2# probe.

$$H12 = \frac{Cm1 - Ce1}{Cm2 - Ce2} \times H2$$

$$H32 = \frac{Cm3 - Ce3}{Cm2 - Ce2} \times H2$$

Firstly dA and dB are calculated, respectively:
A) When the condition of $$Cx2 - Ce2 > \frac{Cx3 - Ce3}{H32} \times H2$$

is compliant, dA is updated, $$dA = \frac{Cx1 - Ce1}{H12}$$

B) When the condition of $$\frac{Cx1 - Ce1}{H12} \times H2 > (Cx2 - Ce2)$$

is compliant, dB is updated, $$dB = \frac{Cx3 - Ce3}{H32}$$

C) When the condition is incompliant, then dA or dB updated for the latest time is used.
D) The present dA and DB are used when the liquid level gauge is just electrified.

Then the liquid level value Hx is calculated:
1) The temporary variable hx of liquid level associated with mapping heights of H12 and H32 is figured out without consideration about E2 and E3:

$$hx = \frac{(Cx1 + Cx2 + Cx3 - Ce1 - Ce2 - Ce3) - (H12 + H2 + H32) \times dB}{dA - dB} + E1$$

2) The position range of liquid level is judged according to the calculated hx value, and the actual liquid level Hx is calculated:
A) At the time of hx>E1+H12+H2, the liquid level is in the place of 3# probe, $$Hx = H1 + H2 + E1 + E2 + E3 + \frac{(hx - E1 - H12 - H2)}{H32} \times H3$$

B) When Condition A is incompliant, and at the time of hx>E1+H12, the liquid level is in the place of 2# probe, $$Hx = +E2 - H12 + H1$$

C) When Condition B is incompliant, and at the time of hx>E1, the liquid level is in the place of 1# probe, $$Hx = (hx - E1) \times \frac{H1}{H12} + E1$$

D) When Condition C is incompliant, it indicates that the liquid level is below 1# probe or at the same level of the bottom end of 1# probe, $$Hx = E1_o$$

Of which:

H1, H2, and H3: are respectively the physical heights of 13 probe, 2# probe, and 3# probe.

H12 and H32: are respectively the mapping heights of 1# probe and 3# probe relative to 2# probe, and under the ideal status of physical structure, H12 is equal to H1 and H32 is equal to H3.

Ce1, Ce2, and Ce3: the capacitances of null value, and are the measured values of capacitances for 1# probe, 2# probe, and 3# probe respectively when medium is air.

Cm1, Cm2, and Cm3: the capacitances of full value, and are the measured values for capacitances of 1# probe, 2# probe, and 3# probe respectively when the medium is calibrated.

Cx1, Cx2, and Cx3: the capacitance values of 1# probe, 2# probe, and 3# probe measured during the work of the liquid level gauge.

E1: the distance from the lower end of 1# probe to the centerline of the water-side pipe of steam drum E2 and E3: are respectively the clearances between 1# probe and 2# probe, as well as between 2# probe and 3# probe.

L: range of the liquid level gauge, namely the center distance of the boiler water-side pipe and the steam-side pipe.

dA: the increment of capacitance between the measurement probes and the metal measurement tube aroused by water relative to air at unit height, and the change in dA has reflected the variation of water dielectric constant.

dB: the increment of capacitance between the measurement probes and the metal measurement tube aroused by steam relative to air at unit height, and the change in dB has reflected the variation of steam dielectric constant.

hx: the temporary variable of liquid level.

Hx: the value of liquid level.

The beneficial effect of this invention is: As the changes in water and steam dielectric constants are only reflected for the situations of boiler startup, boiler shutdown, and boiler joint discharge, etc speaking from this liquid level gauge, while this liquid level gauge for boiler steam drum is able to monitor the dielectric constants of water and steam in a real-time manner, the liquid level values can be outputted reliably and accurately in a continuous way with the liquid level gauge for boiler steam drum designed according to this invention in all the cases, no matter the boiler is under the startup and shutdown, or joint discharge status, thus to achieve the function of continuous measurement of liquid levels under full conditions.

Further description is made below about this invention in combination with figures attached and embodiments.

ATTACHED FIGURES

FIG. 1 is the schematic drawing of the liquid level gauge for continuous measurement of boiler steam drum under full conditions of this invention.

DETAILED DESCRIPTION OF PREFERRED EMBODIMENTS

Embodiment 1

A type of liquid level gauge for continuous measurement of boiler steam drum under full conditions, and refer to FIG. 1, in the FIGURE, H1, H2, and H3 are respectively the physical heights of 1# probe, 2# probe, and 3# probe, E1 is the distance from the lower end of 1# probe to the centerline of the water-side pipe of steam drum, and E2 and E3 are the clearances between 1# probe and 2# probe as well as between 2# probe and 3# probe, respectively. L is the range of the liquid level gauge, namely the center distance of boiler water-side pipe and steam-side pipe. In this embodiment, H1=100 mm, H2=400 mm, H3=150 mm, E1=0, and E2=E3=3 mm.

The liquid level gauge mentioned for boiler steam drum includes one metal measurement tube 4 and one transmitter 11. The steam-side pipe 2 connected to steam drum is fitted on the upper part of the metal measurement tube mentioned and the water-side pipe 1 connected to steam drum is fitted on the lower part of the metal measurement tube mentioned, one insulated jacket pipe 8 is available inside the metal measurement tube mentioned, 1# probe 5, 2# probe 6, and 3# probe 7 are mounted in turn from down upwards inside the insulated jacket pipe mentioned, and respective probes are mutually insulated and not conducted, of which the 1# probe is mainly used for monitoring the dielectric constant of water, the 3# probe is mainly used for monitoring the dielectric constant of steam, and the 2# probe is the main measurement probe. The three probes mentioned are respectively connected with the transmitter 11 through the lead wires 10.

In this embodiment, the lead wire 10 of the probe is the shielded conducting wire, the core on the one end of the shielded conducting wire is connected with probe and the core on the other end of the shielded conducting wire and the shielding layer are connected with the transmitter.

In this embodiment, in order to prevent the mutual signal interference between the three measurement probes, the three probes undertake the measurement by turns. When 1# probe is making measurement, 2# and 3# probe stop measurement, while 2# probe is making measurement, 1# and 3# probes stop measurement, and when 3# probe is making measurement, 1# and 2# probes stop measurement.

In this embodiment, one insulated jacket 8 is available inside the metal measurement tube 4, and both the upper place and the lower place of the metal measurement tube 4 are insulated. Inside the insulated jacket 8, three measurement probes are available from down upwards: 1# probe 5, 2# probe 6, and 3# probe 7, and these three probes are mutually insulated and not conducted. The core on the one end of the three shielded conducting wires is respectively connected to the three probes, and the core on the other end and the shielding layer are connected to the transmitter 11, thus the three probes have formed three capacitances respectively with the metal measurement tube. In order to prevent the signal mutual interference between the three measurement probes, the three probes undertake measurement by turns, while 1# probe is making measurement, 2# and 3# probes stop measurement, and in this analogy. The change in liquid level and variations of water and steam dielectric constants will give rise to corresponding changes in the values of these three capacitances. Transmitter 11 is used for measuring the three values of the capacitances, to calculate the liquid level values, to output the simulated current signals of liquid level and digital communication signals of liquid level. The transmitter 11 is built-in with single chip microcomputer, capacitance measurement, current transformation and transmission, digital communication interface, and other circuits. The microcomputer fulfills signal processing for capacitance measurement, calculation of the liquid level value, output of current value, digital communication, and other tasks. The transmitter calculates the liquid level value through measurement of the three capacitance values between the three probes and the metal measurement tube and outputs the simulated current signal of liquid level through current transmission circuit, for digital communication to be performed on digital communication interface and master computer.

Two connecting pipes, namely the steam-side pipe 2 and the water-side pipe 1 are led out from the metal measurement tube, and the steam-side pipe 2 and the water-side pipe 1 are respectively connected to the steam-side pipe and the water-side pipe of the steam drum, to measure out the liquid level inside the measurement tube, to rightly get the liquid level inside the steam drum, according to the principle of connected vessel. Generally heat insulation measures shall be applied to outside of the measurement tube, so that the temperatures of water and steam inside the measurement tube are approximate to the temperatures of water and steam inside the steam drum, thus to reduce the error of liquid level aroused by density difference.

Embodiment 2

Refer to FIG. 1, and in this embodiment, the method for calculation of liquid level with the liquid level gauge for continuous measurement of boiler steam drum under full conditions is:

Calibration of following parameters is carried out before the liquid level gauge is delivered from the factory:

H1, H2, and H3: are respectively the physical heights of 1# probe, 2# probe, and 3# probe.

E1: the distance from the lower end of 1# probe to the centerline of the water-side pipe of steam drum.

E2 and E3: are respectively the clearances between 1# probe and 2# probe as well as between 2# probe and 3# probe.

Ce1, Ce2, and Ce3: the capacitances of null value, and are the measured values of capacitances for 1# probe, 2# probe, and 3# probe respectively when the medium is air.

dA Presetting: the increment of capacitance between the measurement probes and the metal measurement tube aroused by water relative to air at unit height, and the change in dA has reflected the variation of water dielectric constant.

dB Presetting: the increment of capacitance between the measurement probes and the metal measurement tube aroused by steam relative to air at unit height, and the change in dB has reflected the variation of steam dielectric constant.

The liquid level gauge calibrated through the abovementioned parameters calculates the liquid level value Hx after one group of capacitance values (Cx1, Cx2, and Cx3) is measured each time during the work of the gauge.

Firstly dA and dB are calculated, respectively:

A) When the condition of $$Cx2 - Ce2 > \frac{Cx3 - Ce3}{H3} \times H2$$

is compliant, dA is updated, $$dA = \frac{Cx1 - Ce1}{H1}$$

B) When the condition of $$\frac{Cx1 - Ce1}{H1} \times H2 > (Cx2 - Ce2)$$

is compliant, dB is updated,
B) When the condition of $$\frac{Cx1 - Ce1}{H1} \times H2 > (Cx2 - Ce2)$$

is compliant, dB is updated, $$dB = \frac{Cx3 - Ce3}{H3}$$

C) When condition is incompliant, then dA or dB updated for the latest time is used.

D) The preset dA and dB are used when the liquid level gauge is just electrified.

Then the liquid level value Hx is calculated:

1) The temporary variable hx of liquid level is figured out without consideration of E2 and E3:

$$hx = \frac{(Cx1 + Cx2 + Cx3 - Ce1 - Ce2 - Ce3) - (H1 + H2 + H3) \times dB}{dA - dB} + E1$$

2) The position range of liquid level is judged according to the calculated hx value, and the actual liquid level Hx is calculated:

A) At the time of hx>E1+H1+H2, it indicates that the liquid level is in the place of 3# probe, and at this point Hx shall be added with the clearance E2 between 1# probe and 2# probe as well as the clearance E3 between 2# probe and 3# probe, namely:

Hx=hx+E2+E3

B) When Condition A is incompliant, and at the time of hx>E1+H1, it indicates that the liquid level is in the place of 2# probe, and at this point Hx shall be added with the clearance E2 between 1# probe and 2# probe, namely:

Hx=hx+E2

C) When Condition B is incompliant, it indicates that the liquid level does not exceed 1# probe, and at this point there is no need for Hx to be changed, namely:

Hx=hx

Of which:

H1, H2, and H3: are respectively the physical heights of 1# probe, 2# probe, and 3# probe. In this embodiment, H1=100 mm, H2=400 mm, and H3=150 mm.

Ce1, Ce2, and Ce3: the capacitances of null value, and are the measured values for the capacitances of 1# probe, 2# probe, and 3# probe respectively when the medium is air.

Cx1, Cx2, and Cx3: the capacitance values of 1# probe, 2# probe, and 3# probe measured during the work of the liquid level gauge.

E1: the distance from the lower end of 1# probe to the centerline of the water-side pipe of steam drum. It is the negative value when the lower end of 1# probe is lower than the center area of the water-side pipe, while it is the positive value when it is higher than the center area of the water-side pipe. In this embodiment, the distance from the lower end of 1# probe to the centerline of the water-side pipe of steam drum is 0, namely to allow the lower end of 1# probe and the centerline of the water-side pipe of steam drum to be aligned when it is made.

E2 and E3: are respectively the clearances between 1# probe and 2# probe as well as between 2# probe and 3# probe, 2~3 mm in general, and in this embodiment, both the clearances between 1# probe and 2# probe as well as between 2# probe and 3# probe are 3 mm.

L: range of the liquid level gauge, namely the center distance of the boiler water-side pipe and steam-side pipe.

dA: the increment of capacitance between the measurement probes and the metal measurement lube aroused by water relative to air at unit height, and the change in dA has reflected the variation of water dielectric constant.

dB: the increment of capacitance between the measurement probes and the metal measurement tube aroused by steam relative to air at unit height, and the change in dB has reflected the variation of steam dielectric constant.

hx: The temporary variable of liquid level
Hx: The value of liquid level
When calibrated: Ce1=100 pF Ce2=180 pF Ce3=120 pF
H1=100 mm H2=400 mm H3=150 mm
E1=0 E2=E3=3 dA Presetting=0.2, and dB Presetting=0
The capacitance value is measured at a certain time:
Cx1=125 pF Cx2=228 pF Cx3=125 pF
The calculation process is as follows:
Calculation of dA and dB:

A)

$$Cx2 - Ce2 = 48$$

$$\frac{Cx3 - Ce3}{H3} \times H2 = 13.33$$

When the condition of $$Cx2 - Ce2 > \frac{Cx3 - Ce3}{H3} \times H2$$

is compliant, dA is updated:

$$dA = \frac{Cx1 - Ce1}{H1} = 0.25$$

B)

$$\frac{Cx1 - Ce1}{H1} \times H2 = 100$$

$$Cx2 - Ce2 = 48$$

When the condition of $$\frac{Cx1 - Ce1}{H1} \times H2 > (Cx2 - Ce2)$$

is compliant, dB is updated:

$$dB = \frac{Cx3 - Ce3}{H3} = 0.0333$$

Calculation of liquid level value Hx:
1) The temporary variable hx of liquid level is figured out without consideration about E2 and E3:

$$hx = \frac{(Cx1 + Cx2 + Cx3 - Ce1 - Ce2 - Ce3) - (H1 + H2 + H3) \times dB}{dA - dB} + E1$$
$$= 260.0 \text{ mm}$$

2) The poison range of liquid level judged according to the calculated hx value, and the actual liquid level Hx is calculated:
A) E1+H1+H2=500, incompliant to hx>E1+H1+H2
B) E1+H1=100, compliant to hx>E1+H1, then:

$$Hx = hx + E2 = 260.0 + 3 = 263.0 \text{ mm}$$

Embodiment 3

As certain errors exist with physical factors such as the diameters of three probes, the inner diameter of the measurement tube, and the thickness of insulated jacket, etc, during the production and manufacture of the liquid level gauge for boiler steam drum, for which the increment of capacitance aroused between the three probes by medium at unit height may possibly be inconsistent in the actual application of liquid level of boiler steam drum, it is hence required to set up the values of two mapping heights H12 and H32, to respectively represent the mapping heights of 1# probe and 3# probe relative to 2# probe, thereby to amend the impact of physical errors with the probe and measurement tube of the liquid level gauge on the liquid level value Hx, so that the liquid level gauge for boiler steam drum will be able to give out more accurate liquid level value Hx.

Refer to FIG. 1, and in this embodiment, the method for calculation of liquid level with the liquid level gauge for continuous measurement of boiler steam drum under full conditions is:

The calibration of following parameters is carried out before the liquid level gauge is delivered from the factory:

H1, H2, and H3: are respectively the physical heights of 1# probe, 2# probe, and 3# probe.

E1: the distance from the lower end of 1# probe to the centerline of the water-side pipe of steam drum.

E2 and E3: are respectively the clearances between 1# probe and 2# probe as well as between 2# probe and 3# probe.

Ce1, Ce2, and Ce3: the capacitances of null value, and are the measured values for the capacitances of 1# probe, 2# probe, and 3# probe respectively when the medium is air.

Cm1, Cm2, and Cm3: the capacitances of full value, and are the measured values for the capacitances of 1# probe, 2# probe, and 3# probe respectively when the medium is calibrated. Normally water is adopted to serve as this medium during calibration.

H12 and H32: are respectively the mapping heights of 1# probe and 3# probe relative to 2# probe, and under the ideal status of physical structure, H12 is equal to H1, and H32 is equal to H3 (This parameter may also not be calibrated while it is to be further calculated at the time of calculation).

Its calculation method is:

$$H12 = \frac{Cm1 - Ce1}{Cm2 - Ce2} \times H2$$

$$H32 = \frac{Cm3 - Ce3}{Cm2 - Ce2} \times H2$$

dA Presetting: the increment of capacitance between the measurement probes and the metal measurement tube aroused by water relative to air at unit height, and the change in dA has reflected the variation of water dielectric constant.

dB Presetting: the increment of capacitance between the measurement probes and the metal measurement tube aroused by steam relative to air at unit height.

The liquid level gauge calibrated through abovementioned parameters calculates the liquid level value Hx after one group of capacitance values (Cx1, Cx2, and Cx3) is measured each time during its work.

Firstly dA and dB are calculated, respectively:

A) When the condition of $$Cx2 - Ce2 > \frac{Cx3 - Ce3}{H32} \times H2$$

is compliance, dA is updated, $$dA = \frac{Cx1 - Ce1}{H12}$$

B) When the condition of $$\frac{Cx1 - Ce1}{H12} \times H2 > (Cx2 - Ce2)$$

is compliant, dB is updated, $$dB = \frac{Cx3 - Ce3}{H32}$$

C) When condition is incompliant, then dA or dB updated for the latest time is used.

D) The preset dA and dB are used when the liquid level gauge is just electrified.

Then the liquid level value Hx is calculated:

1) The temporary variable hx of liquid level associated with mapping heights H12 and H32 is figured out without consideration about E2 and E3:

$$hx = \frac{(Cx1 + Cx2 + Cx3 - Ce1 - Ce2 - Ce3) - \frac{(H12 + H2 + H32) \times dB}{dA - dB}}{dA - dB} + E1$$

2) The position range of liquid level judged according to the calculated hx value, and the actual liquid level Hx is calculated:

A) At the time of hx>E1+H12+H2, it indicates that the liquid level is in the place of 3# probe, and at this point Hx is namely the sum of height of 1# probe H1, the height of 2# probe H2, as well as E1, E2, and E3 and the height of liquid level at 3# probe, namely:

$$Hx = H1 + H2 + E1 + E2 + E3 + \frac{(hx - E1 - H12 - H2)}{H32} \times H3$$

B) When Condition A is incompliant, and at the time of hx>E1+H12, it indicates that the liquid level is in the place of 2# probe, and at this point Hx shall be added with the clearance E2 between 1# probe and 2# probe, while at the same time H12 shall be converted back to the physical height H1, namely:

$$Hx = +E2 - H12 + H1$$

C) When Condition B is incompliant, and at the time of hx>E1, it indicates that the liquid level is in the place of 1# probe, and at this point the liquid level in the place of 1# probe shall be calculated back to the physical height according to the proportion of H12 and H1, namely:

$$Hx = (hx - E1) \times \frac{H1}{H12} + E1$$

D) When Condition C is incompliant, it indicates that the liquid level is below 1# probe or at the same level of the bottom end of 1# probe, namely:

$$Hx = E1_o$$

Of which:

H1, H2, and H3: are respectively the physical heights of 1# probe, 2# probe, and 3# probe.

In this embodiment, H1=100 mm, H2=400 mm, and H3=150 mm.

H12 and H32: are respectively the mapping heights of 1# probe and 3# probe relative to 2# probe, and under the ideal status of physical structure, H12 is equal to H1, and H32 is equal to H3.

Ce1, Ce1, and Ce3: the capacitances of null value, and are the measured values for capacitances of 1# probe, 2# probe, and 3# probe respectively when the medium is air.

Cm1, Cm2, and Cm3: the capacitances of full value, and are the measured values for capacitances of 1# probe, 2# probe, and 3# probe respectively when the medium is calibrated. Normally water serves as this medium during calibration, and in this embodiment, water is adopted to serve as this medium.

Cx1, Cx2, and Cx3: the capacitance values of 1# probe, 2# probe, and 3# probe measured during the work of the liquid level gauge.

E1: the distance from the lower end of 1# probe to the centerline of the water-side pipe of steam drum. It is the negative value when the lower end of 1# probe is lower than the center area of the water-side pipe and it is the positive value when the lower end of 1# probe is higher than the center area of the water-side pipe, while in this embodiment the distance from the lower end of 1# probe to the centerline of the water-side pipe of stream drum is 0, namely the lower end of 1# probe is aligned with the centerline of the water-side pipe of steam drum.

E2 and E3: are respectively the clearances between 1# probe and 2# probe as well as between 2# probe and 3# probe. In this embodiment, the both clearances between 1# probe and 2# probe as well as between 2# probe and 3# probe are 3 mm.

L: the range of the liquid level gauge, namely the center distance of the boiler water-side pipe and steam-side pipe.

dA: the increment of capacitance between the measurement probes and the metal measurement tube aroused by water relative to air at unit height, and the change in dA has reflected the variation of water dielectric constant.

dB: the increment of capacitance between the measurement probes and the metal measurement tube aroused by steam relative to air at unit height, and the change in dB has reflected the variation of steam dielectric constant.

hx: the temporary variable of liquid level.
Hx: the value of liquid level.
When calibrated: Ce1=100 pF Ce2=180 pF Ce3=120 pF
Cm1=123 pF Cm2=270 pF Cm3=159 pF
H1=100 mm H2=400 mm H3=150 mm
E1=0 E2=E3=3 dA Presetting=0.2 dB Presetting=0
The capacitance values are measured at a certain time:
Cx1=125 pF Cx2=228 pF Cx3=125 pF
Calculation of the mapping heights H12 and H32:

$$H12 = \frac{Cm1 - Ce1}{Cm2 - Ce2} \times H2 = 102.22 \text{ mm}$$

$$H32 = \frac{Cm3 - Ce3}{Cm2 - Ce2} \times H2 = 173.33 \text{ mm}$$

Calculation of dA and dB:
A)

$$Cx2 - Ce2 = 48$$

$$\frac{Cx3 - Ce3}{H32} \times H2 = 11.54$$

When the condition of $$Cx2 - Ce2 > \frac{Cx3 - Ce3}{H32} \times H2$$

is compliant, dA is updated.

$$dA = \frac{Cx1 - Ce1}{H12} = 0.24457$$

B)

$$\frac{Cx1 - Ce1}{H12} \times H2 = 97.8$$

$$Cx2 - Ce2 = 48$$

When the condition of $$\frac{Cx1 - Ce1}{H12} \times H2 > (Cx2 - Ce2)$$

is compliant, dB is updated.

$$dB = \frac{Cx3 - Ce3}{H32} = 0.0288$$

Calculation of liquid level value Hx:
1) Calculation of temporary variable hx:

$$hx = \frac{(Cx1 + Cx2 + Cx3 - Ce1 - Ce2 - Ce3) - (H12 + H2 + H32) \times dB}{dA - dB} + E1$$
$$= 271.3 \text{ mm}$$

2) The position range of liquid level is judged according to the calculated hx value, and the actual liquid level Hx is calculated:
A) E1+H12+H2=502.22 mm, incompliant to hx>E1+H12+H2
B) E1+H12=102.22 mm, compliant to hx>E1+H12, then:

Hx=hx+E2−H12+H1=271.3+3−102.22+100=272.1 mm

The invention claimed is:
1. A liquid level gauge for continuous measurement of a liquid level in a steam drum under all conditions, comprising:
 a metal measurement tube having a steam-side pipe fitted on an upper part for connecting to the steam drum, and a water-side pipe fitted on a lower part for connecting to the steam drum;
 an insulated jacket pipe disposed inside the metal measurement tube;
 a first probe disposed in the insulated jacket pipe with a first clearance to the water-side pipe to form a first capacitor between the first probe and the metal measurement tube;
 a second probe disposed in the insulated jacket pipe above the first probe with a second clearance to form a second capacitor between the second probe and the metal measurement tube;
 a third probe disposed in the insulated jacket pipe above the second probe with a third clearance to form a third capacitor between the third probe and the metal measurement tube;
 a transmitter having a liquid level calculation method based on capacitance values of the first, second and third capacitors, and heights of the three probes and three clearances; and
 first, second and third lead wires respectively connecting the first, second and third probes to the transmitter;
 wherein the first, second and third probes are mutually insulated and the transmitter calculates the liquid level using the liquid level calculation method through measuring respective capacitance values of the first, second and third capacitors.

2. The liquid level gauge as claimed in claim 1, wherein the first, second and third lead wires are shielded conducting wires each having a core and a shielding layer.

3. The liquid level gauge as claimed in claim 1, wherein the three capacitors are measured one at a time by turns.

4. A method used in a liquid level gauge for calculating a liquid level in a steam drum, comprising the steps of:
   preparing a metal measurement tube having a steam-side pipe fitted on an upper part for connecting to the steam drum, and a water-side pipe fitted on a lower part for connecting to the steam drum;
   disposing an insulated jacket pipe inside the metal measurement tube;
   disposing a first probe in the insulated jacket pipe with a first clearance E1 above a center line of the water-side pipe to form a first capacitor between the first probe and the metal measurement tube, the first probe having a physical height H1, the first capacitor having a null capacitance value Ce1 when air is between the first probe and the metal measurement tube;
   disposing a second probe in the insulated jacket pipe above the first probe with a second clearance E2 to form a second capacitor between the second probe and the metal measurement tube, the second probe having a physical height H2, the second capacitor having a null capacitance value Ce2 when air is between the second probe and the metal measurement tube;
   disposing a third probe in the insulated jacket pipe above the second probe with a third clearance E3 to form a third capacitor between the third probe and the metal measurement tube, the third probe having a physical height H3, the third capacitor having a null capacitance value Ce3 when air is between the third probe and the metal measurement tube;
   measuring the capacitance values Cx1, Cx2 and Cx3 of the first, second and third capacitors;
   calculating dA and dB according to the following rules:
      presetting values for dA and dB when the liquid level gauge is just electrified,
      updating dA with dA=

$$dA = \frac{Cx1 - Ce1}{H1}$$

if $$Cx2 - Ce2 > \frac{Cx3 - Ce3}{H3} \times H2,$$

and
   updating dB with $$dB = \frac{Cx3 - Ce3}{H3}$$

if $$\frac{Cx1 - Ce1}{H1} \times H2 > (Cx2 - Ce2)$$

calculating a temporary variable hx of the liquid level without considering E2 and E3 as follows:

$$hx = \frac{(Cx1 + Cx2 + Cx3 - Ce1 - Ce2 - Ce3) - \frac{(H1 + H2 + H3) \times dB}{dA - dB}}{} + E1$$

; and
   calculating the liquid level Hx according to the following formulas:

$Hx = hx + E2 + E3$ if $hx > E1 + H1 + H2$, $Hx = hx + E2$ if $E1 + H1 + H2 \geq hx > E1 + H1$, and $Hx = hx$ if $hx \leq E1 + H1$.

5. A method of a liquid level gauge for calculating a liquid level in a steam drum, comprising the steps of:
   preparing a metal measurement tube having a steam-side pipe fitted on an upper part for connecting to the steam drum, and a water-side pipe fitted on a lower part for connecting to the steam drum;
   disposing an insulated jacket pipe inside the metal measurement tube;
   disposing a first probe in the insulated jacket pipe with a first clearance E1 above a center line of the water-side pipe to form a first capacitor between the first probe and the metal measurement tube, the first probe having a physical height H1, the first capacitor having a null capacitance value Ce1 when air is between the first probe and the metal measurement tube and a full capacitance value Cm1 when the first capacitor is calibrated with a full liquid level;
   disposing a second probe in the insulated jacket pipe above the first probe with a second clearance E2 to form a second capacitor between the second probe and the metal measurement tube, the second probe having a physical height H2, the second capacitor having a null capacitance value Ce2 when air is between the second probe and the metal measurement tube and a full capacitance value Cm2 when the second capacitor is calibrated with a full liquid level;
   disposing a third probe in the insulated jacket pipe above the second probe with a third clearance E3 to form a third capacitor between the third probe and the metal measurement tube, the third probe having a physical height H3, the third capacitor having a null capacitance value Ce3 when air is between the third probe and the metal measurement tube and a full capacitance value Cm3 when the third capacitor is calibrated with a full liquid level;
   calculating respective mapping heights H12 and H32 of the first and third probes relative to the second probe as follows:

$$H12 = \frac{Cm1 - Ce1}{Cm2 - Ce2} \times H2 \text{ and } H32 = \frac{Cm3 - Ce3}{Cm2 - Ce2} \times H2;$$

measuring the capacitance values Cx1, Cx2 and Cx3 of the first, second and third capacitors;
   calculating dA and dB according to the following rules:
      presetting values for dA and dB when the liquid level gauge is just electrified,
      updating dA with $$dA = \frac{Cx1 - Ce1}{H12}$$

if $$Cx2 - Ce2 > \frac{Cx3 - Ce3}{H32} \times H2$$

and
updating dB with $$dB = \frac{Cx3 - Ce3}{H32}$$

if $$\frac{Cx1 - Ce1}{H12} \times H2 > (Cx2 - Ce2)$$

calculating a temporary variable hx of the liquid level associated with H12 and H32 without considering E2 and E3 as follows:

$$hx = \frac{(Cx1 + Cx2 + Cx3 - Ce1 - Ce2 - Ce3) - (H12 + H2 + H32) \times dB}{dA - dB} + E1;$$

and
calculating the liquid level Hx according to the following formulas:

$$Hx = H1 + H2 + E1 + E2 + E3 + \frac{(hx - E1 - H12 - H2)}{H32} \times H3$$

if hx>E1+H12+H2, $$Hx = hx + E2 - H12 + H1 \text{ if } E1 + H12 + H2 > hx > E1 + H12,$$

$$Hx = (hx - E1) \times \frac{H1}{H12} + E1$$

if E1+H12≧hx>E1, and $$Hx = E1 \text{ if } hx \leq E1.$$

* * * * *